US006815497B1

(12) United States Patent
Luu et al.

(10) Patent No.: US 6,815,497 B1
(45) **Date of Patent: *Nov. 9, 2004**

(54) CROSSLINKABLE CREPING ADHESIVE FORMULATIONS

(75) Inventors: Phuong Van Luu, Appleton, WI (US); Cristian M. Neculescu, Neenah, WI (US); Dawn M. Mews, Plover, WI (US)

(73) Assignee: Fort James Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/496,383

(22) Filed: Feb. 2, 2000

Related U.S. Application Data

(60) Division of application No. 08/955,733, filed on Oct. 22, 1997, which is a continuation-in-part of application No. 08/443,941, filed on May 18, 1995, now abandoned.

(51) Int. Cl.[7] .................................................. C08F 8/42

(52) U.S. Cl. ...................... 525/61; 162/164.6; 162/166; 524/31; 524/503; 524/535; 524/612; 525/54.3; 525/60; 525/274; 525/328.2; 525/370

(58) Field of Search .......................... 524/31, 503, 535, 524/612; 525/60, 61, 54.3, 274, 328.2, 370; 162/164.6, 166

(56) References Cited

U.S. PATENT DOCUMENTS

| | | | |
|---|---|---|---|
| 2,577,840 | A | 12/1951 | Burnham et al. |
| 2,926,116 | A | 2/1960 | Keim |
| 2,926,154 | A | 2/1960 | Keim |
| 3,607,622 | A | 9/1971 | Espy |
| 3,839,307 | A | 10/1974 | Schmifg |
| 3,879,377 | A | 4/1975 | Austin |
| 3,892,731 | A | 7/1975 | Austin |
| 3,949,014 | A | 4/1976 | Maki et al. |
| 4,016,126 | A | 4/1977 | Fumei et al. |
| 4,016,129 | A | 4/1977 | Miyosawa |
| 4,016,179 | A | 4/1977 | Fujimoto et al. |
| 4,064,213 | A | 12/1977 | Lazorisak et al. |
| 4,084,033 | A | 4/1978 | Drelich |
| 4,094,718 | A | 6/1978 | Czerwin |
| 4,098,615 | A | 7/1978 | Cummisford et al. |
| 4,165,433 | A | 8/1979 | Austin |
| 4,217,214 | A | 8/1980 | Dubin |
| 4,217,425 | A | 8/1980 | Ballweber et al. |
| 4,272,590 | A | 6/1981 | Blank |
| 4,280,942 | A | 7/1981 | Green |
| 4,286,087 | A | 8/1981 | Austin et al. |
| 4,304,625 | A | 12/1981 | Grube et al. |
| 4,308,789 | A | 1/1982 | Piloni et al. |
| 4,501,640 | A | 2/1985 | Soerens |
| 4,528,316 | A | 7/1985 | Soerens |
| 4,574,150 | A | 3/1986 | Austin |
| 4,661,431 | A | 4/1987 | Bujese et al. |
| 4,684,439 | A | 8/1987 | Soerens |

(List continued on next page.)

FOREIGN PATENT DOCUMENTS

| | | | |
|---|---|---|---|
| EP | 0 337 310 | A1 | 10/1989 |
| EP | 0 541 232 | A1 | 5/1993 |

OTHER PUBLICATIONS

H. Stutz et al., *A. Generalized Theory for the Glass Transition Temperature of Crosslinked and Uncrosslinked Polymers, J. of Polymer Science*, vol. 28, No. 9 (Aug. 1990), pp. 1483–98.

W. P. Evans, *Cationic Fabric Softeners, Chemistry and Industry*, No. 27 (Jul. 5, 1999), pp. 893–903.

R. R. Egan, *Cationic Surface Active Agents as Fabric Softeners, J. of the Am. Oil Chemist's Soc.,* vol. 55, No. 1 (Jan. 1978), pp. 118–21.

B.C. Trivedi et al., *Quaternization of Imidazoline: Unequivocal Structure Proof, J. of the Am. Oil Chemist's Soc.*, vol. 58, No. 6 (Jun. 1981), pp. 754–756.

J. D. Bates, *Softness Index: Fact or Mirage, Tappi*, vol. 48, No. 4 (Apr. 1965), pp. 63A–64A.

M. Falk, *Characterization of Crepe Structure by Image Analysis*, presented at the STFI Tissue Making Conference in Karlstad, Sweden, Oct. 5–6, 1989, pp. 39–50.

Co–Pending U.S. Application No. 08/955,733 to Luu et al.

Co–Pending U.S. Application No. 09/496,823 to Luu et al.

Co–Pending U.S. Application No. 09/496,821 to Luu et al.

Co–Pending U.S. Application No. 09/904,102 to Luu et al.

Kelly L. Magee and James L. Taylor, "Pitch Fixation/Emulsification in Newsprint: Mechanisms and Mill Experiences," published in Book 2 of the Proceedings of the 1994 Papermakers Conference in San Francisco, CA, pp. 621–627.

*Primary Examiner*—Judy M. Reddick
(74) *Attorney, Agent, or Firm*—Finnegan, Henderson, Farabow, Garrett & Dunner, L.L.P.

(57) ABSTRACT

Disclosed are adhesive formulations as creping process aids for producing an absorbent creped cellulosic sheet having a high level of surface-perceived softness that comprises continuously forming a web of cellulosic papermaking fibers, adhering said web to a thermal drying means by means of adhesive compositions comprising polymers having at least one primary or secondary amine group in the backbone such as chitosan, plolyvinylamine, polyvinyl alcohol-vinyl amine and polyaminoamide in combination with crosslinking agents such as zirconium compounds having a valence of plus four including ammonium zirconium carbonate, zirconium acetylacetonate, zirconium acetate, zirconium carbonate, zirconium sulfate, zirconium phosphate, potassium zirconium carbonate, zirconium sodium phosphate and sodium zirconium tartrate and creping said treated web from said thermal drying means. In the method for producing the absorbent creped cellulosic sheets, the zirconium crosslinking agent is advantageously applied directly and separately on the Yankee dryer at the time the base polymer is applied to the surface. The crosslinking agent functions to crosslink the polymer to the fibrous web. The absorbent paper products are used as bathroom tissue and towels.

14 Claims, 5 Drawing Sheets

U.S. PATENT DOCUMENTS

| | | | | | |
|---|---|---|---|---|---|
| 4,720,383 | A | | 1/1988 | Drach et al. | |
| 4,734,395 | A | | 3/1988 | Ogata et al. | |
| 4,843,778 | A | | 7/1989 | Puder | |
| 4,844,970 | A | | 7/1989 | Goldstein et al. | |
| 4,886,579 | A | | 12/1989 | Clark et al. | |
| 4,921,621 | A | | 5/1990 | Costello et al. | |
| 4,950,361 | A | | 8/1990 | Bender et al. | |
| 4,952,656 | A | | 8/1990 | Lai et al. | |
| 5,011,883 | A | | 4/1991 | Aksman | |
| 5,086,777 | A | | 2/1992 | Hishii | |
| 5,147,908 | A | | 9/1992 | Floyd et al. | |
| 5,155,167 | A | | 10/1992 | Pinschmidt, Jr. et al. | |
| 5,194,492 | A | | 3/1993 | Pinschmidt, Jr. et al. | |
| 5,230,774 | A | * | 7/1993 | Greer et al. | 162/164.6 |
| 5,232,553 | A | | 8/1993 | Smigo et al. | |
| 5,246,544 | A | * | 9/1993 | Hollenberg et al. | 162/111 |
| 5,246,548 | A | * | 9/1993 | Aston et al. | 162/199 |
| 5,269,983 | A | | 12/1993 | Schulz | |
| 5,281,307 | A | * | 1/1994 | Smigo et al. | 162/164.3 |
| 5,300,194 | A | | 4/1994 | Welkener et al. | |
| 5,300,566 | A | | 4/1994 | Pinschmidt, Jr. et al. | |
| 5,326,809 | A | | 7/1994 | Bott et al. | |
| 5,368,694 | A | | 11/1994 | Rohlf et al. | |
| 5,374,334 | A | | 12/1994 | Sommese et al. | |
| 5,382,323 | A | | 1/1995 | Furman, Jr. et al. | |
| 5,525,665 | A | | 6/1996 | Moeggenborg et al. | |
| 5,700,560 | A | * | 12/1997 | Kotani et al. | 428/325 |
| 5,969,029 | A | * | 10/1999 | Kotani et al. | 524/447 |

* cited by examiner

PEEL FORCE VERSUS GLYOXAL LEVEL FOR UNFUNCTIONALIZED PVOH

GLYOXAL LEVEL (PHR) - SPRAY POS. 51

PEEL FORCE VERSUS GLYOXAL LEVEL FOR VINYL AMINE (VA) FUNCTIONALIZED PVOH ADHESIVE

GMT VERSUS GLYOXAL LEVEL FOR VINYL AMINE FUNCTIONALIZED PVOH ADHESIVES

GLYOXAL LEVEL (PHR) - SPRAY POS. 51

CROSSLINKABLE CREPING ADHESIVE FORMULATIONS

RELATED APPLICATIONS

This application is a division of application Ser. No. 08/955,733 filed Oct. 22, 1997 which is a continuation in part of Ser. No. 08/443,941 filed on May 18, 1995 now abandoned.

CROSSLINKABLE CREPING ADHESIVE FORMULATIONS

This invention relates to papermaking. More particularly, this invention is concerned with the manufacture of grades of paper that are suitable for use in paper toweling, napkins, facial tissue, and bathroom tissue by methods that include creping utilizing novel adhesives used as creping process aids.

BACKGROUND OF THE INVENTION

In the manufacture of tissue and towel products, a common step is the creping of the product. This creping is done to provide desired aesthetic and performance properties to the product. Many of the aesthetic properties of tissue and towel products rely more upon the perceptions of the consumer than on properties that can be measured quantitatively. Such things as softness, and perceived bulk are not easily quantified, but have significant impacts on consumer acceptance. Since many of the properties of tissue and towel products are controlled or are at least influenced by the creping process, it is of interest to develop methods for controlling the creping process. Although the creping process is not well understood, it is known that changes in the process can result in significant changes in the product properties. A need exists to provide a method for influencing the creping process by allowing the control of the adhesion of the tissue or towel substrate to the surface from which it is creped, most usually large cylindrical dryers known in the industry as Yankee dryers.

Paper is generally manufactured by suspending cellulosic fibers of appropriate length in an aqueous medium and then removing most of the water to form a web. The paper derives some of its structural integrity from the mechanical arrangement of the cellulosic fibers in the web, but most by far of the paper's strength is derived from hydrogen bonding which links the cellulosic fibers to one another. With paper intended for use as bathroom tissue, the degree of strength imparted by this interfiber bonding, while necessary to the utility of the product, results in a lack of perceived softness that is inimical to consumer acceptance. One common method of increasing the perceived softness of bathroom tissue is to crepe the paper. Creping is generally effected by fixing the cellulosic web to a Yankee drum thermal drying means with an adhesive/release agent combination and then scraping the web off of the Yankee by means of a creping blade. Creping, by breaking a significant number of interfiber bonds, increases the perceived softness of the resulting bathroom tissue product, In the past, common classes of thermosetting adhesive resins which have been used as Yankee dryer adhesives have been represented by poly (aminoamide)-epichlorohydrin polymers (hereinafter referred to as PAE resins), such as those polymers sold under the tradenames Kymene, Rezosol, Cascan-id, and Amrezs. Each of these materials represent products sold respectively by the Hercules Chemical Company, the Houghton Company, the Borden Company, and Georgia-Pacific. Although these materials are now in commercial use, our novel adhesive formulations are environmentally friendly and have lower in-use cost.

This invention provides adhesion which is equal or better than the adhesion characteristics available through the use of PAE resins but having none of the attendant environmental problems associated with the halogen moiety. The halogen free, particularly chloride free, Yankee dryer adhesives of this invention prevent or inhibit chloride or halogen induced corrosion of the Yankee drum surface and, also, are friendly to the environment and have a lower in use cost.

Obtaining and maintaining adhesion of tissue and towel products to Yankee dryers is an important factor in determining crepe quality. Inadequate adhesion results in poor or non-existing creping, whereas excessive adhesion may result in poor sheet quality and operational difficulties. Traditionally, creping adhesives alone or in combination with release agents have been applied to the surface of the dryer in order to provide the appropriate adhesion to produce the desired crepe. Various types of creping adhesives have been used to adhere fibrous webs to dryer surfaces such as Yankee dryers. Some examples of prior art creping adhesives are disclosed in U.S. Pat. Nos. 4,886,579; 4,528,316 and 4,501,640.

Prior Art of interest includes Smigo U.S. Pat. No. 5,232,553, Miyosawa U.S. Pat. No. 4,016,126 and Hollenberg, et al., U.S. Pat. No. 5,246,544. None of these relate to the creping adhesives of this invention. The Smigo patent discloses certain combinations of polyvinylamides suitable for reducing fines in the paper making process. Smigo's patent is specifically directed to retaining fines from recycle of waste papers. The Miyosawa patent is directed to hardenable coating compositions, particularly films. The coatings consist of silica-polyvinyl-alcohol complexes and are unrelated to the creping adhesives disclosed herein.

The Hollenberg et al., U.S. Pat. 5,246,544 discloses a preparation of an adhesive from polymers not containing amine moieties wherein the adhesive is prepared prior to its application on a dryer. The amine moiety containing copolymers of this invention are neither disclosed nor suggested by Hollenberg. The Hollenberg reference is not directed to the adhesives disclosed herein since the adhesives of this invention are prepared on the Yankee surface. The reactivity of the components of the adhesives of this invention are such that if they were mixed together prior to spraying on the Yankee surface a polymerization of the components would take place which would be useless as creping adhesives. The Hollenberg adhesives cannot be prepared on the Yankee surface since they do not contain amine moieties which can interchange with the carbon containing moiety of the zirconium crosslinking agent of this invention.

U.S. Pat. No. 5,246,544 describes a creping adhesive that provides the ability to control coating mechanical properties and adhesion, and which can be more easily removed from dryer surfaces. The adhesive system described in said patent provides high adhesion of a fibrous web to a dryer surface with low "friction". Having low friction means that the fibrous web can easily be removed from the dryer surface. Other references of interest include U.S. Pat. Nos. 5,232,553 and 4,684,439. All the prior art patents are of interest but do not disclose polymers having at least one primary or secondary amine group In the backbone such as chitosan, polyvinylamine, polyvinyl alcohol-vinyl amine, polyaminoamide and etc., in combination with the zirconium crosslinking compounds having a valence of plus four such as ammonium zirconium carbonate, zirconium acetylacetonate, zirconium acetate, zirconium carbonate, zirconium sulfate, zirconium phosphate, potassium zirconium carbonate, zirconium sodium phosphate and sodium zirconium tartarate. In our process, the creping adhesive is formed on the Yankee surface wherein the carbon containing moiety of the zirconium crosslinking agent is exchanged with the amine moiety of the copolymer. The vinylamide copolymer also crosslinks with the cellulose moiety of the absorbent paper. These patents also do not relate to creping adhesives or the creping of tissue and towel from a Yankee dryer. U.S. Pat. Nos. 5,374,334 and 5,382,323 relate to adhesives reacted with the crosslinking agent prior to establishing contact with the Yankee surface. In our novel process the crosslinking agents are charged to the Yankee surface at the same time as the adhesive polymer wherein the adhesive of this invention is formed on the Yankee surface.

SUMMARY OF THE INVENTION

The present invention provides creping adhesives which are friendly to the environment giving off no chlorine compound pollutants, can be applied directly to the Yankee from aqueous solution and are substantially less costly than the presently available creping adhesives. The present invention provides an improved creping adhesive which provides the ability to readily control glass transition (Tg) and adhesion and which can be more easily removed from dryer surfaces.

An advantageous feature of the present invention is that the adhesion properties of specific types of polymers or copolymers (hereinafter referred to as base polymers) can be systematically changed by varying the amount of crosslinking that may occur when the base polymer is dried onto the surface of a Yankee dryer with the zirconium crosslinking agents. Because crosslink density influences the mechanical properties (i.e., modulus, brittleness, Tg), this permits the adjustment of adhesion/release of the fibrous substrate onto the surface of the dryer. Base polymers having at least one primary or secondary amine groups in the backbone such as chitosan, polyvinylamine, polyvinyl alcohol-vinyl amine, polyaminoamide and etc., crosslinked with zirconium compounds having a valence of plus four produces an adhesive friendly to the environment and which is much less costly than the PAE resin available on the market as discussed in the background section. The invention also relates to a process for applying such base polymers without pre-crosslinking to achieve adhesion control on the paper machine through spray application. This invention also relates to creped fibrous webs, creped tissue and creped towel and a process for the manufacturing of these paper products utilizing the novel adhesives of this invention.

BRIEF DESCRIPTION OF THE DRAWINGS

The present invention will become more fully understood from the detailed description given herein below and the accompanying drawings which are given by way of illustrations only, and thus do not limit the present invention.

DETAILED DESCRIPTION OF THE INVENTION

In accordance with the present invention, a method is provided for producing a highly absorbent, cellulosic sheet having a high level of perceived softness that comprises continuously a) preparing an aqueous dispersion of cellulosic papermaking fibers, b) forming a web of said cellulosic papermaking fibers, c) adhering the web to a dryer surface such as a Yankee dryer with base polymers wherein suitably the base polymer can have both primary and secondary amine groups or a mixture of primary and secondary amine groups. Representative base polymers include polyvinyl alcohol-vinyl amine copolymers, chitosan, polyvinylamine and polyaminoamide. The base polymers are crosslinked to themselves or to the fibrous web with materials such as zirconium compounds having a valence of plus four. The base polymers having at least one primary or secondary amine group or a mixture of primary and secondary amine groups are prepared according to the methods disclosed in the following U.S. Pat. Nos. 5,155,167; 5,194,492; 5,300,566; 4,574,150; 4,286,087; 4,165,433; 3,892,731 and 3,879,377 which are hereby incorporated by reference into this application. The cellulosic sheet was creped from the Yankee dryer by a creping blade thus providing a higher degree of perceived softness. Suitable paper products obtained utilizing the novel adhesives include single and multi ply tissue and towel.

The zirconium compounds having a valence of four is crosslinked preferably with the amine moiety of the organic polymer. That reaction is set forth herein.

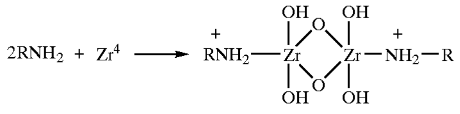

The reaction with the cellulose fiber is postulated as follows:

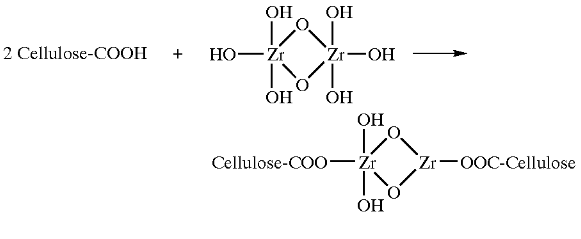

The zirconium crosslinking agent also reacts with alcohol moiety of the organic polymer according to the following equations.

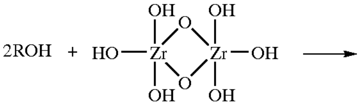

-continued

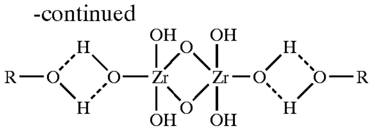

Thus the zirconium compound crosslinking agents facilitate the crosslinking of the organic polymer to the cellulose fiber.

Useful polyaminoamides have the following repeating unit structure:

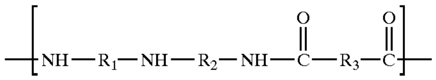

wherein $R_1$ and $R_2$ have two to eight aliphatic carbon atoms and $R_3$ has two to six carbon atoms.

Figure 2:
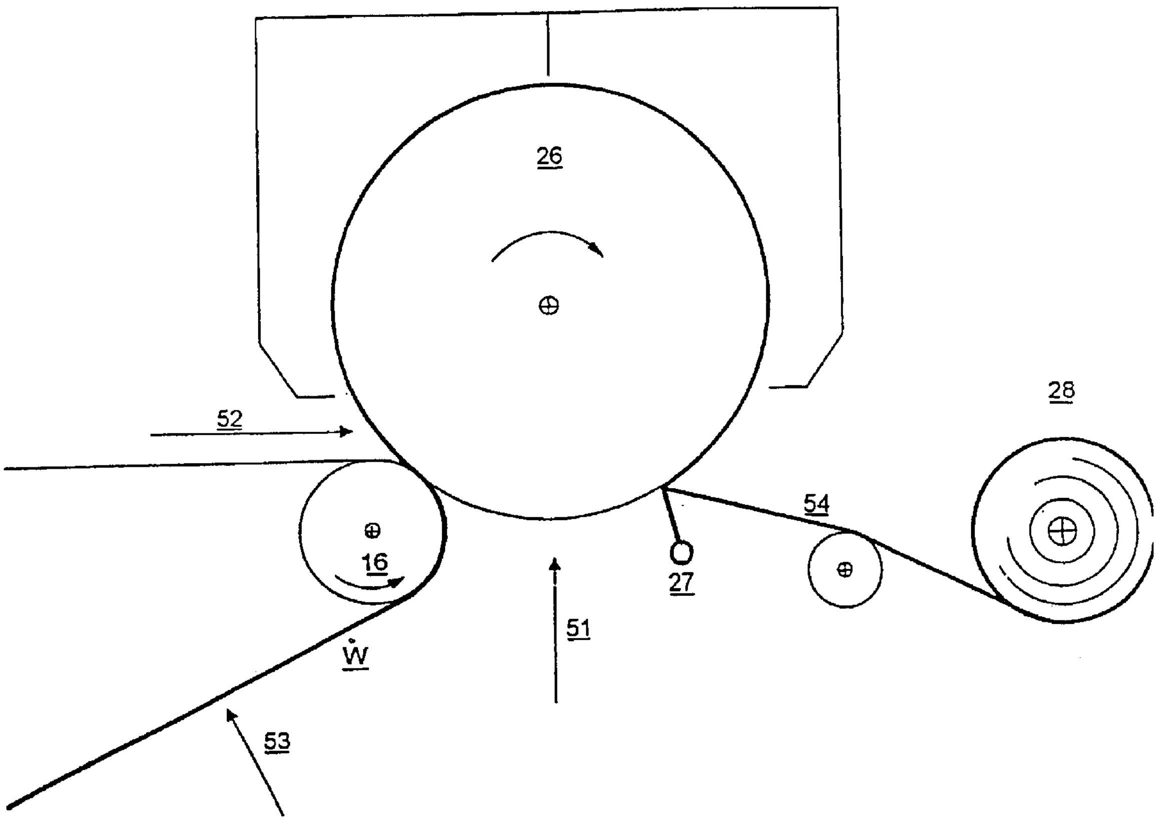
FIG. 2 illustrates in detail the Yankee dryer and the position from which the base polymer and the crosslinking agent, and if necessary, the softener can be sprayed on the Yankee or the web.

The preferred polyvinyl alcohol and polyvinylamine copolymer has the following structure:

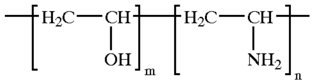

where m and n have values of about 1 to 99 and about 99 to 1. Advantageously the values of m and n are about 1 to 99 and about 2 to 20. The polyvinyl alcohol-vinyl amine copolymer can have impurities which comprise the unhydrolized starting product. The structure of an impure product is disclosed in U.S. Pat. Nos. 5,300,566 and 5,194,492 and those patents are incorporated into this patent application by reference. The crosslinking agent sprayed with the polyvinyl alcohol-vinyl amine copolymer as shown in FIG. 2 at position 51 is a zirconium compound having a valence of plus four such as ammonium zirconium carbonate, zirconium acetylacetonate, zirconium acetate, zirconium carbonate, zirconium sulfate, zirconium phosphate, potassium zirconium carbonate, zirconium sodium phosphate and sodium zirconium tartrate. The zirconium crosslinking agents and polyvinyl alcohol-vinyl amine base polymer are sprayed separately at the same time on the Yankee surface. The crosslinking agent and base polymer were reacted directly on the Yankee surface. Spraying the adhesive on the Yankee is the best mode of application of the adhesives.

The novel adhesives are environmentally friendly and are very capable of ready application to the Yankee surface from aqueous solution. Additionally the adhesives are substantially less expensive than present PAE resin products. In some applications for the manufacturer of tissue and towel, suitable softeners are utilized. The softeners are sprayed on the web as shown in FIG. 2 from position 52 or 53.

For the sake of simplicity, the invention will be described immediately herein below in the context of a conventional dry crepe wet-forming process. A schematic drawing depicting a process configuration is set forth in FIG. 1.

Figure 1:
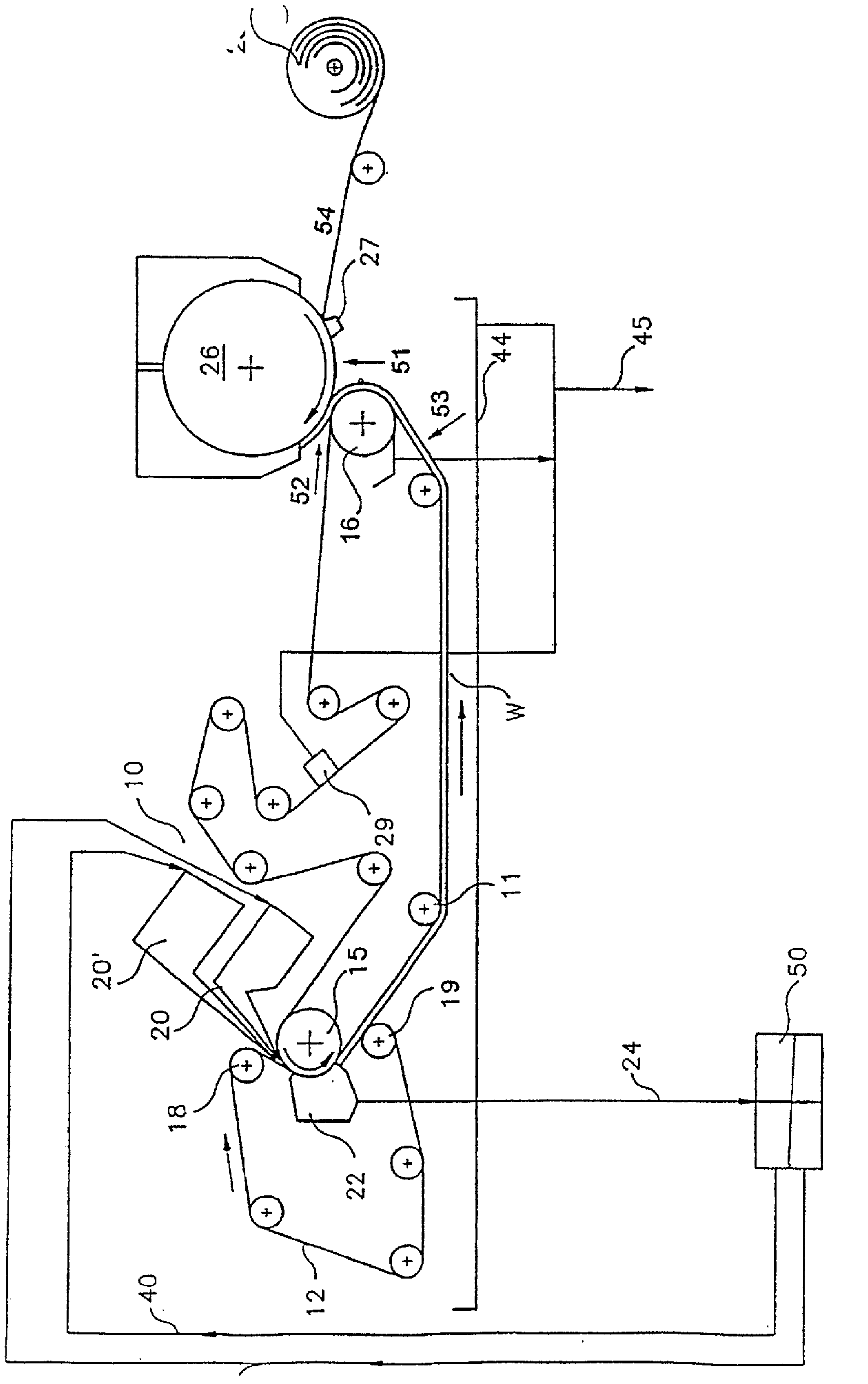
FIG. 1 illustrates a paper making process.

The paper products, such as tissue and towel, of the present invention may be manufactured on any papermaking machine of conventional forming configurations such as fourdrinier, twin-wire, suction pressure roll or crescent forming configurations. The forming mode is advantageously water or foam. FIG. 1 illustrates an embodiment of the present invention wherein a machine chest 50 is used for preparing furnishes that may mutually be treated with chemicals having different functionality depending on the character of the various a fibers, particularly fiber length and coarseness. The furnishes are transported through conduits 40 and 41 where the furnishes are delivered to the headbox of a crescent forming machine 10. This FIG. 1 includes a web-forming ends or wet end with a liquid permeable foraminous support member 11 which may be of any conventional configuration. Foraminous support member 11 may be constructed of any of several known materials including photo polymer fabric, felt, fabric or a synthetic filament woven mesh base with a very fine synthetic fiber batt attached to the mesh base. The foraminous support member 11 is supported in a conventional manner on rolls, including press roll 15 and couch roll or pressing roll 16.

Forming fabric 12 is supported on rolls 18 and 19 which are positioned relative to the press roll 15 for pressing the press wire 12 to converge on the foraminous support member 11 at the cylindrical press roll 15 at an acute angle relative to the foraminous support member 11. The foraminous support member 11 and the wire 12 move in the same direction and at the same speed which is the same direction of rotation of the pressure roll 15. The pressing wire 12 and the foraminous support member 11 converge at an upper surface of the forming roll 15 to form a wedge-shaped space or nip into which two jets of water or foamed-liquid fiber dispersion is pressed between the pressing wire 12 and the foraminous support member 11 to force fluid through the wire 12 into a save all 22 where it is collected for reuse in the process.

A wet nascent web W formed in the process is carried by the foraminous support member 11 to the pressing roll 16 where the wet nascent web W is transferred to the drum 26 of a Yankee dryer. Fluid is pressed from the wet web W by pressing roll 16 as the web is transferred to the drum 26 of the Yankee dryer where it is dried and creped by means of a creping blade 27. The finished web is collected on a take-up roll 28.

A pit 44 is provided for collecting water squeezed from the nascent web W by the press roll 16 and the Uhle box 29. The water collected in the pit 44 may be collected into a flow line 45 for separate processing to remove surfactant and fibers from the water and to permit recycling of the water back to the papermaking machine 10. The liquid, suitably foamed liquid, is collected from the furnish in the save all 22 and is returned through line 24 to a recycle process generally indicated by box 50.

Dewatering of the wet web is provided prior to the thermal drying operation, typically by employing a nonthermal dewatering means. The nonthermal dewatering step is usually accomplished by various means for imparting mechanical compaction to the web, such as vacuum boxes, slot boxes, coacting press rolls, or combinations thereof. For purposes of illustration of the method of this invention, the wet web may be dewatered by subjecting same to a series of vacuum boxes and/or slot boxes. Thereafter, the web may be further dewatered by subjecting same to the compressive forces exerted by nonthermal dewatering means such as, for example, a utilizing roll 15, followed by a pressure roll 16 coacting with a thermal drying means. The wet web is carried by the foraminous conveying means 11, 12 through the nonthermal dewatering means, and is dewatered to a fiber consistency of at least about 5% up to about 50%, preferably at least 15% up to about 45%, and more preferably to a fiber consistency of approximately 40%.

The dewatered web is applied to the surface of thermal drying means, preferably a thermal drying cylinder such as a Yankee drying cylinder 26, employing the zirconium crosslinking agent having a valence of plus four with the polyvinyl alcohol-vinyl amine copolymer. Under the definition of "Yankee" is included all large cast-iron drying cylinders some of which may be ceramic coated on which towel, tissue, wadding, and machine-glazed papers are among the grades produced. Diameters typically range from 10–20 feet and widths can approach 300 inches. A typical diameter for a Yankee drying drum is 12 feet. Speeds in excess of 6000 ft/min. at weights greater than 380,000 pounds are not uncommon. Dryers typically incorporate a center shaft and are supported on journals by two large antifriction bearings. Steam, up to 160 psig (Code limitation for cast-iron unfired pressure vessels) is supplied through the front-side journal and exhausted, along with condensate, through the back-side journal. A typical steam pressure is 125 psig. Pressure rolls 16, one or two usually loaded between 200 and 500 pounds/linear inch, are employed to press the sheet uniformly against the shell face. The sheet is removed from the dryer several quadrants away, having been imparted with properties characteristic of the desired paper product.

Adhesion of the dewatered web to the cylinder surface is facilitated by the mechanical compressive action exerted thereon, generally using one or more press rolls 16 that form a nip in combination with thermal drying means 26. This brings the web into more uniform contact with the thermal drying surface.

Since we prefer to use high adhesion creping, to quantify the degree of adhesion, we define adhesion as the force in grams required to peel a 12 inch wide sheet off the creping cylinder at a 90 degree angle with the creping blade in the off-load position. We have found that using the creping adhesive of this invention, it is possible to control adhesion such that the junction between the sheet and Yankee (26) exhibits relatively high adhesion compared to conventional adhesives which include PAE resins. High adhesion level is preserved when our crosslinkable adhesive formulations are used as the creping process aids in the presence of softener and debonder. Specifically, when softener is used in the range of one (1) to about ten (10) pounds per ton, adhesion is good as defined by the peel force of about 300 to about 900 grams per 12 inches, when using a papermaking machine having a speed of less than one hundred fifty feet per minute (150 ft./minute). Generally, when softener is added, adhesion is decreased. Unlike conventional adhesives of the PAE type and the like, utilization of our crosslinkable adhesive formulation in conjunction with softener, allows one to minimize the difference between air and Yankee side friction of the creped product while preserving overall low friction, all of which promote high quality crepe structure required for good tissue and towel softness.

Alternatively adhesion can be indirectly measured as sheet tension with the creping blade in on-load position. Sheet tension should be in the range of 600–1,500 grams per 12 inches. The sheet tension is measured by the transducer idler roll positioned prior to take-up roll 28. If paper machine speed, basis weight, furnish refining and other operational parameters are kept constant, then sheet tension is a function of adhesion only.

FIG. 2 illustrates the drying and creping of the cellulosic web to produce tissue and towel. According to our process, both one ply and multi-ply towel and tissue are produced. According to the process of the invention, the novel adhesives each comprising base polymer and crosslinking agent are sprayed directly on the Yankee (26) at position 51. In the event it is desired to use softeners, these are sprayed on the air side of the web from position 52 or 53 as shown in FIG. 2. When using the zirconium crosslinking agent then both the base polymer and the crosslinking agent are sprayed separately but almost simultaneously on the heated Yankee surface.

The various components of the adhesive formulation may all be dissolved, dispersed, suspended, or emulsified in a liquid carrying fluid. It should be noted that the crosslinking agents in our process are sprayed directly on the Yankee surface with the base polymer. This liquid will generally be a non-toxic solvent such as water. The liquid component is usually present in an amount of 90 to 99% by weight of the total weight of the creping adhesive. The pH of the adhesive when it is applied to the desired surface in the papermaking operation will normally be about 7.5 to 11. The solvent preferably consists essentially or completely of water. If other types of solvents are added, they are generally added in small amounts.

Referring to the drawing in FIG. 2, this represents one of a number of possible configurations used in processing tissue and towel products. In this particular arrangement, the transfer and impression fabric carries the formed, dewatered web W around turning roll 15 to the nip between press roll 16 and Yankee dryer 26. The fabric, web and dryer move in the directions indicated by the arrows. The entry of the web to the dryer is well around the roll from creping blade 27 which, as schematically indicated, crepes the traveling web from the dryer as indicated at 27. The creped web W exiting from the dryer is wound into a soft creped tissue, or towel at roll 28. To adhere the nascent web W to the surface of the dryer, a spray 51 of adhesive is applied to the surface ahead of the nip between the press roll 16 and Yankee 26. Alternately, the spray may be applied to the traveling web W directly as shown at 53. Suitable apparatus for use with the present invention are disclosed in U.S. Pat. Nos. 4,304,625 and 4,064,213, which are hereby incorporated by reference.

This illustration does not incorporate all the possible configurations used in presenting a nascent web to a Yankee dryer. It is used only to describe how the adhesives of the present invention can be used to promote adhesion and thereby influence the crepe of the product. The present invention can be used with all other known processes that rely upon creping the web from a dryer surface. In the same manner, the method of application of the adhesive to the surface of the dryer or the web is not restricted to spray applications, although these are generally the simplest method for adhesive application.

The present invention is useful for the preparation of fibrous webs which are creped to increase the thickness and bulk of the web and to provide texture to the web. The invention is particularly useful in the preparation of final products such as facial tissue, toilet tissue, paper towels, and the like. The fibrous web can be formed from various types of wood pulp based fibers which are used to make the above products such as hardwood kraft fibers, softwood kraft fibers, hardwood sulfite fibers, softwood sulfite fibers, high yield fibers such as chemo-thermo-mechanical pulps (CTMP), thermomechanical pulps (TMP) or refiner mechanical pulps (RMP). Furnishes used may also contain or be totally comprised of recycled fibers (i.e., secondary fibers). The fibrous web, prior to application to the Yankee dryer, usually has a water content of 40 to 80 wt. %, more preferably 50 to 70 wt %. At the creping stage, the fibrous web usually has a water content of less than 7 wt. %, preferably less than 5 wt. %. The final product, after creping and drying, has a basis weight of 7 to 30 pounds per 3000 square foot ream.

The non-self-crosslinkable base polymer of the present invention called the base polymer, has at least one primary or secondary amine groups in the backbone such as chitosan, polyvinylamine, polyvinyl alcohol-vinyl amine, polyaminoamide and etc., or combinations thereof and the crosslinking agents are zirconium compounds having a valence of plus four. Suitable zirconium crosslinking agents include ammonium zirconium carbonate, zirconium acetylacetonate, zirconium acetate, zirconium carbonate, zirconium sulfate, zirconium phosphate, potassium zirconium carbonate, zirconium sodium phosphate and sodium zirconium tartrate.

The non-self-crosslinkable base polymer should be present in the creping adhesive in an amount sufficient to provide the desired results in the creping operation. If it is intended to spray the creping adhesive onto the surface of the Yankee dryer, the creping adhesive should have a viscosity low enough to be easily sprayed yet high enough to provide a sufficient amount of adhesion. When the creping adhesive is sprayed onto the surface of the Yankee dryer, it should have a total solids content of about 0.01 to 0.5, preferably 0.03 to 0.2% by weight based on the total weight of the fiber. The solids content is constituted primarily by the base polymer and the zirconium crosslinking agent. The zirconium crosslinking agent having a valence of plus four is sprayed separately on the Yankee surface and only comes in contact with the base polymer on the heated Yankee surface, whereby the combined action of drying and heating effect crosslinking required for adhesion.

The crosslinking agent should be present on the Yankee surface in the creping adhesive formulation in an amount sufficient to provide changes in the mechanical properties of the base polymer once the solution has been evaporated and the polymer crosslinked. As the level of crosslinking increases, the mechanical properties change with the crosslink density. Increased crosslinking generally will increase the Tg, increase the brittleness, hardness, and provide a different response to mechanical stresses than uncrosslinked polymers. Obtaining the appropriate crosslink density will depend not only on the relative concentration of added crosslinking agent but also on the molecular weight of the polymer. Early work demonstrated that, in general, as the molecular weight of the starting polymer increases, the amount of crosslinking agent necessary to provide particular levels of final properties (i.e., Tg, brittleness, etc.) decreases. A discussion concerning the relationship between Tg and crosslinking of polymers is contained in the article by Stutz et al., *Journal of Polymer Science,* 28, 1483–1498 (1990), the entire contents of which is hereby incorporated by reference.

In our process the ratio of the base polymer to the crosslinking agent can be varied widely. The function of the crosslinking agent is to control adhesion. The weight ratio of the crosslinking agent to base polymer may go up to 4:1. The preferred ratio is about 0.05:1 to about 2:1. The base polymer can be a homopolymer or a copolymer. It should be noted that in our process all the crosslinking was activated on the heated Yankee surface.

While the base polymer and crosslinking agent are the major "active" ingredients of the present invention, other materials can be incorporated with beneficial results. Materials can be added to modify the mechanical properties of the crosslinked base polymers. Some of these materials may actually be incorporated into the crosslinked polymer. Examples would include glycols (ethylene glycol, propylene glycol, etc.), polyethylene glycols, and other polyols (simple sugars and oligosaccharides). Other components can be added to modify interfacial phenomena such as surface tension or wetting of the adhesive solution. Nonionic surfactants such as the octyl phenoxy based Triton (Rohm & Haas, Inc.) surfactants or the Pluronic or Tetronic (BASF Corp.) surfactants can be incorporated in the present invention to improve surface spreading or wetting capabilities. Mineral oils or other low molecular weight hydrocarbon oils or waxes can be included to modify interfacial phenomena and thereby control adhesion.

The non-self-crosslinking base polymer, polymer modifiers, surfactants, and anti-corrosion additives, will all be dissolved, dispersed, suspended, or emulsified in a liquid carrying fluid. This liquid will usually be a non-toxic solvent such as water. In our novel process the zirconium crosslinking agents such as ammonium zirconium carbonate, zirconium acetylacetonate, zirconium acetate, zirconium carbonate, zirconium sulfate, zirconium phosphate, potassium zirconium carbonate, zirconium sodium phosphate and sodium zirconium tartrate crosslinking agents were sprayed directly on the Yankee surface to avoid reaction with the base polymer and the crosslinking agent prior to reaching the heated Yankee surface.

Nitrogenous softeners/debonders can suitably be added in the paper manufacturing process. The softener may suitably be added with the furnish, but is preferably sprayed from position 53 as shown in FIG. 2, or also sprayed to the sheet while the sheet is on the Yankee as shown in FIG. 2 position 52.

Representative softeners have the following structure:

$$[(RCO)_2EDA]HX$$

wherein EDA is a diethylenetriamine residue, R is the residue of a fatty acid having from 12 to 22 carbon atoms, and X is an anion or $$[(RCONHCH_2CH_2)_2NR']HX$$

wherein R is the residue of a fatty acid having from 12 to 22 carbon atoms, R' is a lower alkyl group, and X is an anion.

The preferred softener is Quasoft® 202-JR and 209-JR made by Quaker Chemical Corporation which is a mixture of linear amine amides and imidazolines of the following structure:

(i)

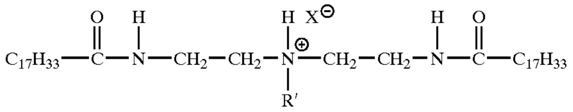

and (ii)

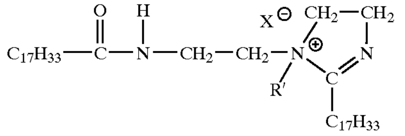

wherein X is an anion.

As the nitrogenous cationic softener/debonder reacts with a paper product during formation, the softener/debonder either ionically attaches to cellulose and reduces the number of sites available for hydrogen bonding thereby decreasing the extent of fiber-to-fiber bonding or covalently attaches to the crosslinking agent to produce improved softness due to enhanced substantivity of softener to fiber.

The present invention may be used with a particular class of softener materials—amido amine salts derived from partially acid neutralized amines. Such materials are disclosed in U.S. Pat. No. 4,720,383; column 3, lines 40–41. Also relevant are the following articles: Evans, *Chemistry and Industry,* 5 Jul. 1969, pp. 893–903; Egan, *J. Am. Oil Chemist's Soc.*, Vol. 55 (1978), pp. 118–121; and Trivedi et al., *J. Am. Oil Chemist's Soc.*, June 1981, pp. 754–756. All of the above are incorporated herein by reference. As indicated therein, softeners are often available commercially only as complex mixtures rather than as single compounds. While this discussion will focus on the predominant species, it should be understood that commercially available mixtures would generally be used to practice the invention.

At this time, Quasoft® 202-JR and 209-JR is a preferred softener material which is derived by alkylating a condensation product of oleic acid and diethylenetriamine. Synthesis conditions using a deficiency of alkylating agent (e.g., diethyl sulfate) and only one alkylating step, followed by pH adjustment to protonate the non-ethylated species, result in a mixture consisting of cationic ethylated and cationic non-ethylated species. A minor proportion (e.g., about 10%) of the resulting amido amines cyclize to imidazoline compounds. Since these materials are not quaternary ammonium compounds, they are pH-sensitive. Therefore, in the practice of the present invention with this class of chemicals, the pH in the headbox should be approximately 6 to 8, more preferably 6 to 7 and most preferably 6.5 to 7.

The softener employed for treatment of the furnish is provided at a treatment level that is sufficient to impart a perceptible degree of softness to the paper product but less than an amount that would cause significant runnability and sheet strength problems in the final commercial product. The amount of softener employed, on a 100% active basis, is preferably from about 0.1 pounds per ton of fiber in the furnish up to about 10 pounds per ton of fiber in the furnish, the more preferred amount is from about 2 to about 5 pounds per ton of fiber in the furnish.

Esthetics and tactile considerations are extremely important for tissue products as they often come into intimate contact with the most delicate parts of the body in use. Consequently, demand is quite high for products with improved tactile qualities, particularly softness. However, as tissue products are frequently used to avoid contact with that which the consumer would greatly prefer not to touch, softness alone is not sufficient; strength is also required. Merely providing a product with improved properties is not generally sufficient; the "on the shelf" appearance of the product must suggest both strength and softness while consumers must be able to sense improvements by handling the packaged product. Appearance is critical; bulk, weight, compressibility, firmness, texture and other qualities perceived as indicia of strength and softness are also required.

TAPPI 401 OM-88 (Revised 1988) provides a procedure for the identification of the types of fibers present in a sample of paper or paperboard and estimation of their quality. Analysis of the amount of the softener/debonder chemicals retained on the tissue paper can be performed by any method accepted in the applicable art. For the most sensitive cases, we prefer x-ray photoelectron spectroscopy ESCA to measure nitrogen levels. Normally, the background level is quite high and the variation between measurements quite high, so use of several replicates in a relatively modem ESCA system such as the Perkin Elmer Corporation's model 5600 is required to obtain more precise measurements. The level of cationic nitrogenous softener/debonder such as Quasoft® 202-JR can alternatively be determined by solvent extraction of the Quasoft® 202-JR by an organic solvent followed by liquid chromatography determination of the softener/debonder.

Tensile strength of tissue produced in accordance with the present invention is measured in the machine direction and cross-machine direction on an Instron tensile tester with the gauge length set to 4 inches. The area of tissue tested is assumed to be 3 inches wide by 4 inches long. A 20 pound load cell with heavyweight grips applied to the total width of the sample is employed. The maximum load is recorded for each direction. The results are reported in units of "grams per 3-inch"; a more complete rendering of the units would be "grams per 3-inch by 4-inch strip".

Softness is a quality that does not lend itself to easy quantification. J.D. Bates, in "Softness Index: Fact or Mirage?", *TAPPI*, Vol. 48 (1965), No. 4, pp. 63A–64A, indicates that the two most important readily quantifiable properties for predicting perceived softness are (a) roughness and (b) what may be referred to as stiffness modulus. Tissue and toweling produced according to the present invention have a more pleasing texture as measured by reduced values of either or both roughness or stiffness modulus (relative to control samples). Surface roughness can be evaluated by measuring geometric mean deviation in the coefficient of friction using a Kawabata KES-SE Friction Tester equipped with a fingerprint-type sensing unit using the low sensitivity range. A 25 g stylus weight is used, and the instrument readout is divided by 20 to obtain the mean deviation in the coefficient of friction. The geometric mean deviation in the coefficient of friction (GMMD) is then the square root of the product of the deviation in the machine direction and the cross-machine direction, thereafter is referred to as friction. The stiffness modulus is determined by the procedure for measuring tensile strength described above, except that a sample width of 1 inch is used and the modulus recorded is the geometric mean of the ratio of 50 grams load over percent strain obtained from the load-strain curve.

The STFI values set forth in tables 1, 6, 7 and 8 are obtained by the method disclosed in the publication of the proceedings at the Tissue Making Conference, Oct. 5–6, 1989 in Karlstad, Sweden entitled *Characterization of Crepe Structure by Image Analysis*, Magnus Falk, STFI, Sweden, pp. 39–50. In our method, the tissue is placed under a stereo microscope with the Yankee side up and illuminated in the MD with oblique illumination roughly 10 degrees out of plane. Images (9) are collected at a magnification of 16× at 512×512×256 resolution and corrected for the nonuniformity in illumination. The images are segmented (transformed from greylevel to binary) such that 50% of the area is shadow. Nine equally spaced scans are conducted on each image and the shadow lengths determined and saved in a data base. The data are fitted interactively to an Erlang distribution to determine the best fit. STFI length is related to crepe coarseness—i.e. a lower STFI number corresponds to a finer crepe structure which in turn contributes to higher perceived softness.

The following examples are illustrative of the present invention. It should be understood that the examples are not included to limit the invention and that various changes may be made by those skilled in the art without changing the essential characteristics and the basic concepts of the invention.

EXAMPLE 1

This example illustrates the general papermaking process utilizing our adhesive formulations and optional softeners. Further data are set forth in Tables 1 and 2.

A furnish of 50% Northern hardwood kraft and 50% Northern softwood kraft was prepared. The papermaking machine was an inclined wire former with a Yankee dryer speed of 100 ft. per minute. Two-tenths of a pound of base polymer with specified crosslinking agent amount per ton of furnish was sprayed directly on the Yankee; the amount of softener sprayed on the Yankee side of the sheet is set forth in Table 1. The creping angle was maintained constant at 72°. The bevel was 8°. The Yankee temperature was 101° C. The adhesive formulations were sprayed from position 51, as shown in FIG. 2, directly on the Yankee, while the softeners, if used, were sprayed from position 52, as shown in FIG. 2, which is the air side of the sheet on the Yankee.

EXAMPLE 2

Examples 2 and 3 illustrate the manufacturing method for one and two ply tissues. The adhesive and softener data are not provided in these examples but are set forth in the subsequent examples.

A furnish of 50% Southern hardwood kraft and 50% Southern softwood kraft was prepared. The papermaking machine was an inclined wire former with a Yankee dryer speed of 1852 feet per minute. The operating data for the papermaking process are set forth in Table 2. A high basis weight base sheet was prepared.

TABLE 2

| ONE PLY TISSUE SHEET (HEAVY WEIGHT) | VALUE | UNITS |
|---|---|---|
| Forming speed/reel speed | 1852/1519 | ft/min. |
| Furnish | 50% SWK (Naheola Pine)<br>50% HWK (Naheola Gum) | — |
| Refining (softwood only) | 25 | hp |
| Stratification | Homogeneous | — |
| MD/CD tensile ratio | 2.0–2.5 | — |
| Basis weight | 16.6 | lb./ream* |
| Dry stock flow | 16 | lb./min |
| Yankee steam/Hood temp. | 100/700 (start pts.) | psig/deg. F |
| Infrared heater | ON | — |
| Moisture | 4 | % |
| Calender load | "low load" | — |
| Reel crepe | 18 | % |
| Crepe blade bevel | 15 | deg. |

*Ream = 3000 Sq. ft.

EXAMPLE 3

A furnish of 50% Southern hardwood kraft and 50% Southern softwood kraft was prepared. The papermaking

TABLE 1

Adhesion and Sheet Physical Properties for Creping Adhesive Formulations

| Creping System Formulation | Peel Force (g/12") | Std Dev | Sheet Tension (g/12") | Std Dev | MD Tensile (g/3") | CD Tensile (g/3") | GM Tensile (g/3") | STIFFNESS (G/% STR.-IN) | Friction | STFI * Length (μM) |
|---|---|---|---|---|---|---|---|---|---|---|
| Houghton (PAE) 8290 | 735 | 46 | 1101 | 11 | 2216 | 969 | 1465 | 44.22 | 0.29 | 176 |
| Houghton 9280 (PAE) + 1 lb. Softener per ton of furnish | 547 | 9 | 740 | 3 | 2470 | 1103 | 1651 | 43.43 | 0.26 | 143 |
| A1 (6 mol % vinyl amine) | 818 | 50 | 1220 | 33 | 2513 | 1061 | 1633 | 53.66 | 0.28 | 174 |
| A1 + 50 PHR glyoxal | 716 | 29 | 1287 | 1 | 2223 | 939 | 1445 | 52.83 | 0.26 | 167 |
| A1/Airvol 107 (4 mol % VA) | 727 | 15 | 1149 | 2 | 2346 | 1160 | 1650 | 46.97 | 0.25 | 171 |
| A1/Airvol 107 (4 mol % VA) + 50 PHR glyoxal | 854 | 18 | 1179 | 2 | 2264 | 918 | 1441 | 44.77 | 0.27 | 166 |
| A1/Airvol 107 (2 mol % VA) | 618 | 34 | 1106 | 16 | 2440 | 1152 | 1676 | 50.42 | 0.28 | 177 |
| A1/Airvol 107 (2 mol % VA) + 25 PHR glyoxal | 616 | 20 | 1200 | 0 | 2553 | 1245 | 1783 | — | — | 179 |
| A1 + 1 lb. softener per ton of furnish | 480 | 93 | 765 | 90 | 2940 | 1465 | 2073 | 61.87 | 0.26 | 148 |
| A1 + 1 lb. softener per ton of furnish + 50 PHR glyoxal | 674 | 8 | 991 | 5 | 2576 | 1263 | 3804 | 62.12 | 0.29 | 140 |
| A1 + 3 lb. softener per ton of furnish | 236 | 17 | 337 | 12 | 2676 | 1019 | 1709 | 46.44 | 0.28 | 168 |
| A1 + 3 lb. softener per ton of furnish + 50 PHR glyoxal | 372 | 60 | 443 | 103 | 2427 | 978 | 1540 | 42.53 | 0.31 | 168 |

(1) Base polymer add on = 0.2 lbs per ton of furnish.

(2) PHR glyoxal = grams glyoxal per 100 g base polymer (3) A1 = Polyvinyl alcohol – 6 mol % vinyl amine copolymer. Intermediate mol % vinyl amine contents achieved by blending A1 with unfunctionalized PVOH (Airvol 107).

(4) Airvol ® 107 = PVOH adhesive 98.4 percent hydrolyzed and having a molecular weight of 40,000 g/mol.

* STFI values determined from publication at Tissue Making Conference, October 5–6, 1989 in Karistad, Sweden, Characterization of Crepe Structure by Image Analysis, Magnus Falk, STFI, Sweden, pp. 39–50.

machine was an inclined wire former with a Yankee dryer speed of 3450 feet per minute. The operating data for the papermaking process are set forth in Table 3. A low basis weight base sheet was prepared.

TABLE 3

| TWO PLY TISSUE SHEET (LIGHT WEIGHT) | VALUE | UNITS |
|---|---|---|
| Forming speed | 3450 | ft/min. |
| Reel crepe | 18 | % |
| Yankee steam pressure | 75 | psi |
| Wet end hood temperature | 550 | deg. F |
| Jet/wire ratio | 0.94 | — |
| Headbox slice | 0.500 | in |
| Refiner flow | 48 | gal/min. |
| Total headbox flow | 1980 | gal/min. |
| Refining (softwood only) | 42 | hp |
| Basis weight | 9.6 | lb./ream* |
| Moisture | 4 | % |
| Crepe blade bevel | 15 | deg. |

*Ream = 3000 Sq. feet

EXAMPLE 4

Table 4 provides the chemical code designation and description of the adhesives, crosslinking agents, softeners, and release agents employed in Examples 1, 5, 6, 7 and 8.

TABLE 4

Figure 3:
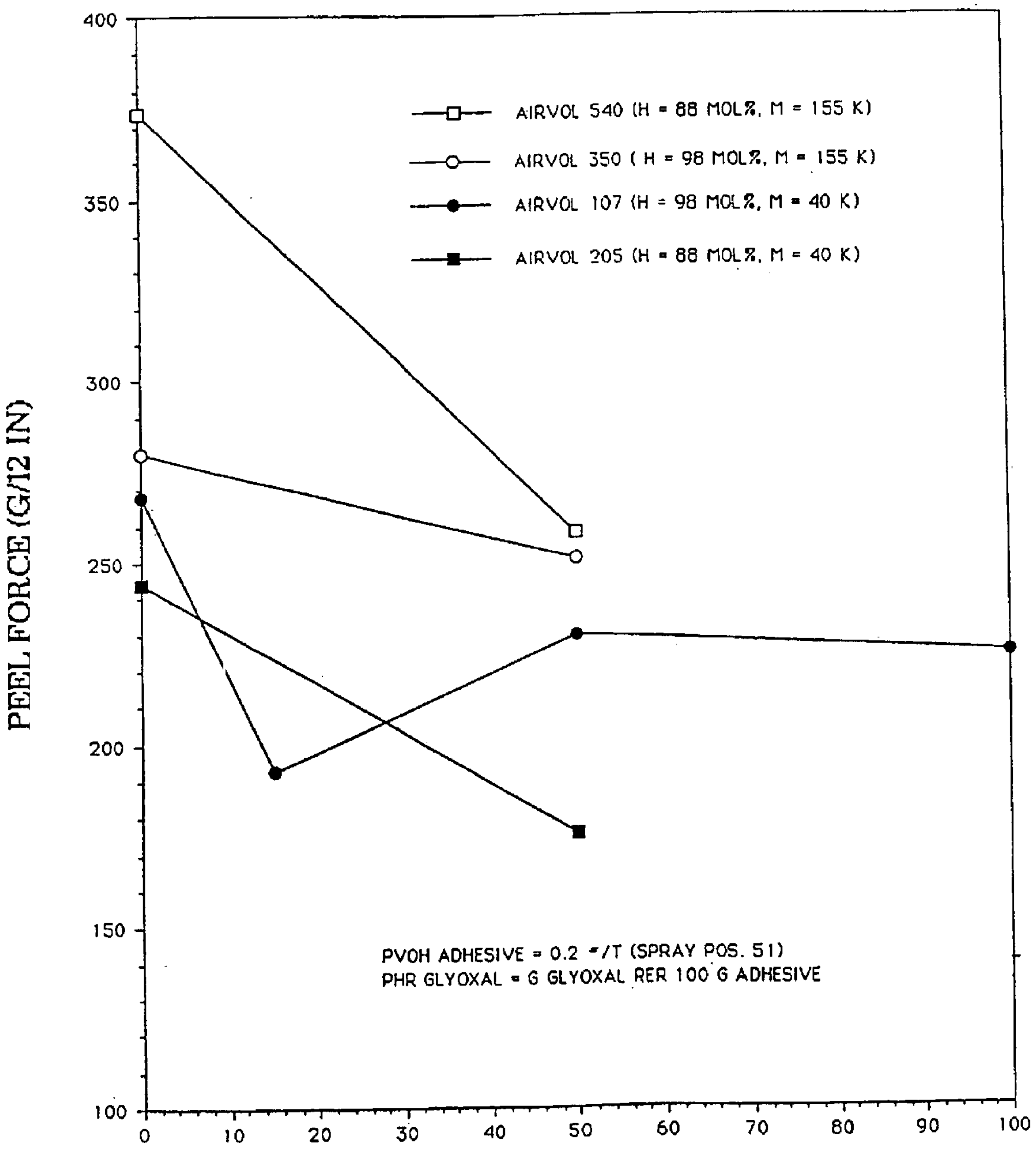
FIG. 3 illustrates the effect of glyoxal crosslinking agent on polyvinyl alcohol (PVOH) Yankee adhesion, as measured by peel force, for different molecular weight and hydrolysis degrees.
Figure 4:
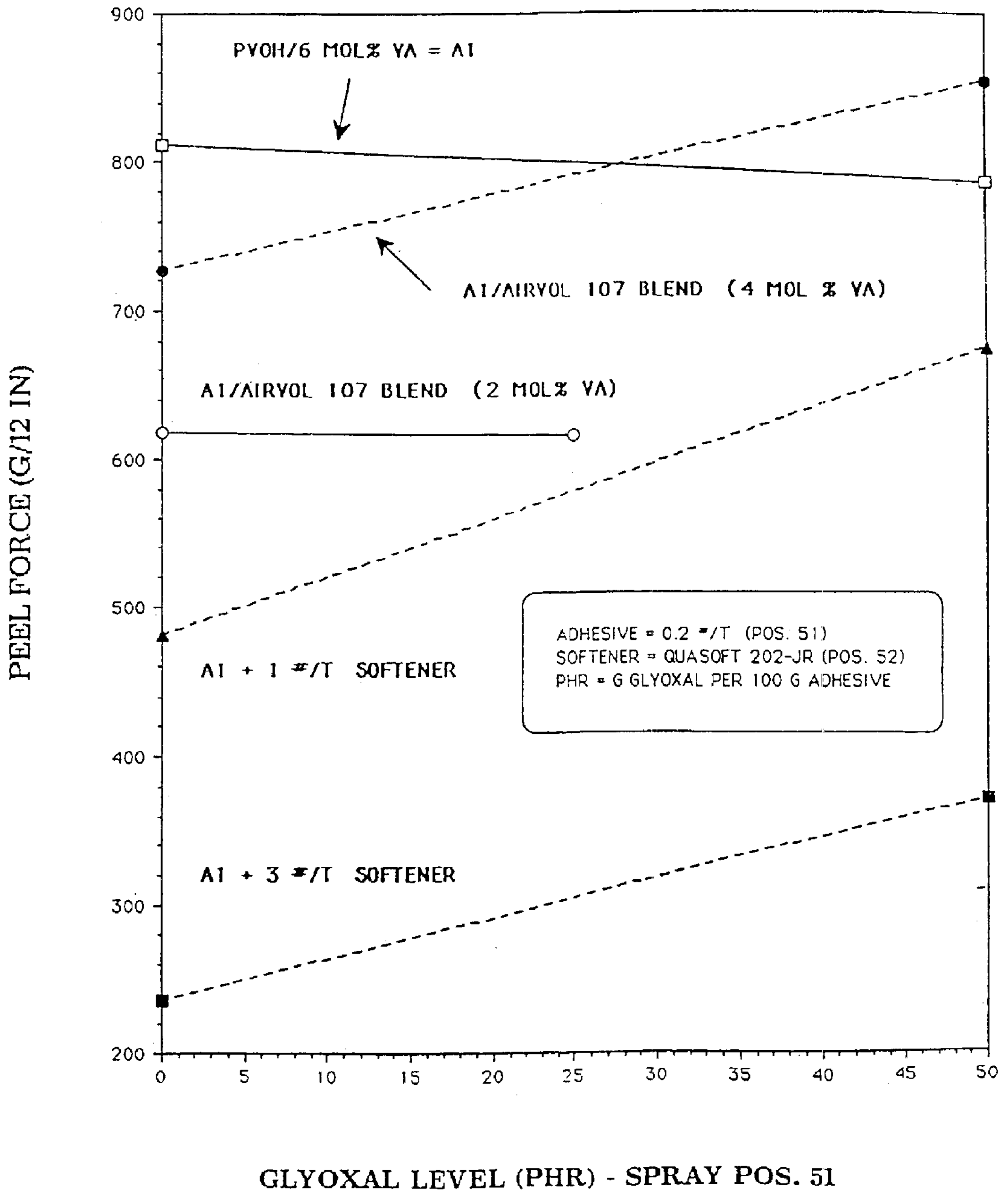
FIG. 4 illustrates the effect of glyoxal crosslinking agent on polyvinyl alcohol-vinyl amine copolymer adhesion and blend with unfunctionalized polyvinyl-alcohol, as measured by peel force with and without softener.
Figure 5:
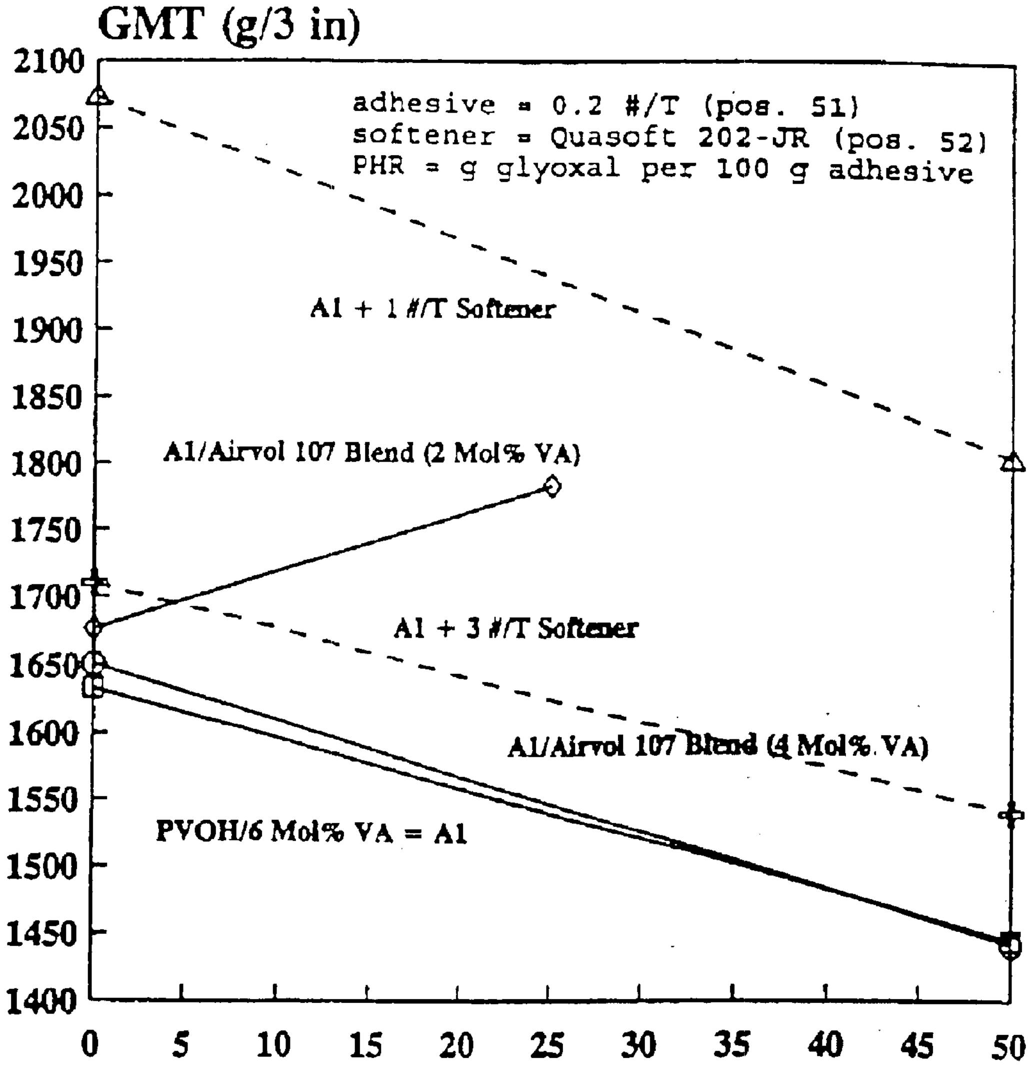
FIG. 5 illustrates the GMT ( grams/3 inches ) versus the glyoxal level incorporated into the base polymer such as polyvinyl alcohol-vinyl amine copolymer, and blend with unfunctionalized polyvinyl alcohol, with and without softener.

Descriptions of Chemical Compounds Used In Examples 5–8 and FIGS. 3–5

| CHEMICAL DESIGNATION | COMMENTS |
|---|---|
| H8290 (PAE) | Houghton Rezosol ® 8290 adhesive (polyaminoamide-epichlorohydrin) |

TABLE 4-continued

Descriptions of Chemical Compounds Used In Examples 5–8 and FIGS. 3–5

| CHEMICAL DESIGNATION | COMMENTS |
|---|---|
| A1 | Polyvinyl alcohol-6 mol % vinyl amine copolymer |
| GLYOXAL | Crosslinking agent for A1, supplied by Hoechst Celanese as 40% solution |
| AZC | Ammonium zirconium carbonate (crosslinking agent for A1), supplied by Magnesium Elektron, Inc. as 20% solution (BACOTE ® 20) |
| 202-JR | Quaker Quasoft ® 202-JR softener (fatty diamide quat based on diethylene triamine and C14–C18 unsaturated fatty acids) |
| H565 | Houghton 565 release (mineral oil based) |
| AIRVOL-107 | Polyvinyl Alcohol (Mol. Wt. = 40,000 g/mol, Hydrolysis = 98 mol %), supplied by Air Products and Chemicals, Inc. |
| AIRVOL-540 | Polyvinyl Alcohol (Mol. Wt. = 155,000 g/mol, Hydrolysis = 88 mol %), supplied by Air Products and Chemicals, Inc. |
| AIRVOL-350 | Polyvinyl Alcohol (Mol. Wt. = 155,000 g/mol, Hydrolysis = 98 mol %), supplied by Air Products and Chemicals, Inc. |
| AIRVOL-205 | Polyvinyl Alcohol (Mol. Wt. = 40,000 g/mol, Hydrolysis = 88 mol %), supplied by Air Products and Chemicals, Inc. |

EXAMPLE 5

This example gives the adhesive formulations for papermaking process described in Examples 6, 7 and 8. In Tables 5, 6 and 7 data has been set forth for each of the 17 cells. Table 5 summarizes these examples and lists the cell number, base polymer, glyoxal, ammonium zirconium carbonate, softener, release agent and states whether the furnish was refined or unrefined and gives the basis weight of the paper sheet. The sheet tension values and sidedness parameters are not given in this table but are set forth in Tables 6, 7 and 8 where applicable.

TABLE 5

| | BASE POLYMER (0.2 #/T) | GLYOXAL (#/T) | AZC (#/T) | 202-JR (#/T) | H565 (#/T) | REFINING (1) (HP) | BASIS WEIGHT (#/REAM) |
|---|---|---|---|---|---|---|---|
| 1 | A1 | 0.2 | — | 1.0 | 0.25 | NONE | 16.6 |
| 2 | A1 | 0.2 | — | 1.0 | 0.25 | 25 | 16.6 |
| 3 | H8290 (PAE) | — | — | 1.0 | 0.25 | 25 | 16.6 |
| 4 | A1 | — | 0.02 | 1.0 | 0.25 | NONE | 16.6 |
| 5 | A1 | — | 0.10 | 1.0 | 0.25 | NONE | 16.6 |
| 6 | A1 | — | 0.02 | 1.0 | 0.25 | 25 | 16.6 |
| 7 | A1 | — | 0.10 | 1.0 | 0.25 | 25 | 16.6 |
| 8 | A1 | — | — | 1.0 | 0.25 | NONE | 16.6 |
| 9 | H8290 (PAE) | — | — | 1.0 | 0.25 | NONE | 16.6 |
| 10 | A1 | — | — | 1.0 | 0.25 | 25 | 16.6 |
| 11 | A1 | 0.4 | — | 1.0 | 0.25 | NONE | 16.6 |
| 12 | A1 | 0.2 | — | 1.0 | 0.25 | NONE | 16.6 |
| 13 | A1 | 0.4 | — | 1.0 | 0.25 | 25 | 16.6 |
| 14 | H8290 (PAE) | — | — | — | 2.5 | 42 | 9.6 |
| 15 | A1 | — | 0.02 | — | 2.5 | 42 | 9.6 |
| 16 | A1 | — | 0.04 | — | 2.5 | 42 | 9.6 |
| 17 | A1 | 0.4 | — | — | 2.5 | 42 | 9.6 |

(1) Refining softwood only
(#/T) = pounds per ton of furnish

EXAMPLE 6

This example illustrates that when the adhesive consisting of PVOH-VAM copolymer crosslinked with AZC is used, sheet tension values are obtained which are equivalent or better than the values obtained for the commercial PAE control product. The base sheet for the two ply tissue was prepared according to the process of Example 3. The description of the additives, crosslinking agents, and softeners are set forth in Table 5. Sheet tension and corresponding base sheet properties achieved with the PVOH-VAM copolymer crosslinked with glyoxal or ammonium zirconium carbonate package are at least as good or better to the undesirable chlorine containing Houghton 8290 (PAE) adhesive. The data is set forth in Table 6. The ammonium zirconium carbonate package is superior to the PAE resin package and also to the glyoxal crosslinking package as evidenced by lower STFI length and friction parameters. It should be noted that glyoxal is added to the PVOH-VAM copolymer just prior to spraying on the Yankee dryer while the ammonium zirconium carbonate is sprayed separately but simultaneously with the PVOH-VAM copolymer.

EXAMPLE 7

This example illustrates that using the novel adhesive formulations with softners facilitated the production of low sidedness one ply tissue. The base sheet for the one ply tissue was prepared according to the papermaking process of Example 2. The data for this Example are set forth in Table 7. The data in Table 7 clearly demonstrate the adhesive capacity of ammonium zirconium carbonate and glyoxal crosslinking agents. In this example softeners are used to reduce the sidedness of the one ply tissue. The data demonstrate that our novel adhesive formulations are compatible with softeners.

TABLE 6

Low Basis Weight Basesheet Data For Two Ply Tissue (Refining Level = 42 Hp)

| CELL | FORMULATION | SHEET TENSION (G/24 IN) | BASIS WEIGHT (#/ream) | GMT (G/3 IN) | STFI * LENGTH (μM) | STIFFNESS (G/% STR.-IN) | FRICTION |
|---|---|---|---|---|---|---|---|
| 14 (control) | 0.2 #/T H8290 PAE<br>2.5 #/T H565 | 1038 ± 8 | 9.6 | 427 | 131 | 35.7 | 0.15 |
| 15 | 0.2 #/T A1<br>0.02 #/T AZC<br>2.5 #/T H565 | 1039 ± 18 | 9.9 | 446 | 121 | 34.0 | 0.14 |
| 16 | 0.2 #/T A1<br>0.04 #/T AZC<br>2.5 #/T H565 | 1057 ± 13 | 9.5 | 414 | 125 | 36.3 | 0.14 |
| 17 | 0.2 #/T A1<br>0.4 #/T GLYOXAL<br>2.5 #/T H565 | 1085 ± 5 | 9.3 | 384 | 129 | 30.1 | 0.15 |

#/T H8290 PAE = pounds of adhesive per ton of furnish
#/T H565 = pounds of release agent per ton of furnish
#/T A1 = pounds of adhesive per ton of furnish
#/T AZC = pounds of crosslinking agent per ton of furnish
#/T GLYOXAL = pounds of crosslinking agent per ton of furnish
* STFI values determined from publication at Tissue Making Conference, October 5–6, 1989 in Karlstad, Sweden, Characterization of Crepe Structure by Image Analysis, Magnus Falk, STFI, Sweden, pp. 39–50.

TABLE 7

High Basis Weight Basesheet Data (No Refining) For One Ply Tissue

| CELL | FORMULATION | SHEET TENSION (G/24 IN) | BW (#/ream) | GMT (G/3 IN) | STFI * LENGTH (μM) | STIFFNESS (G/% STR.-IN) | FRICTION | S(1) |
|---|---|---|---|---|---|---|---|---|
| 9 | 0.2 #/T H8290 PAE<br>1.0 #/T 202-JR<br>0.25 #/T H565 | 600 ± 17 | 16.4 | 598 | 167 | 18.5 | 0.22 | 0.31 |
| 8 | 0.2 #/T A1<br>1.0 #/T 202-JR<br>0.25 #/T H565 | 308 ± 8 | 16.2 | 747 | 171 | 23.1 | 0.23 | 0.32 |

TABLE 7-continued

High Basis Weight Basesheet Data (No Refining) For One Ply Tissue

| CELL | FORMULATION | SHEET TENSION (G/24 IN) | BW (#/ream) | GMT (G/3 IN) | STFI * LENGTH (μM) | STIFFNESS (G/% STR.-IN) | FRICTION | S(1) |
|---|---|---|---|---|---|---|---|---|
| 4 | 0.2 #/T A1<br>0.02 #/T AZC<br>1.0 #/T 202-JR<br>0.25 #/T H565 | 375 ± 47 | 17.3 | 752 | 172 | 22.9 | 0.23 | 0.23 |
| 5 | 0.2 #/T A1<br>0.10 #/T AZC<br>1.0 #/T 202-JR<br>0.25 #/T H565 | 433 ± 21 | 16.6 | 667 | 166 | 22.7 | 0.19 | 0.21 |
| 12 | 0.2 #/T A1<br>0.2 #/T GLYOXAL<br>1.0 #/T 202-JR<br>0.25 #/T H565 | 267 ± 32 | 16.1 | 695 | 180 | 23.7 | 0.23 | 0.31 |
| 11 | 0.2 #/T A1<br>0.4 #/T GLYOXAL<br>1.0 #/T 202-JR<br>0.25 #/T H565 | 372 ± 36 | 17.1 | 752 | 179 | 22.0 | 0.22 | 0.30 |

S(1)= SIDEDNESS PARAMETER = (A/Y)GMMMD WHERE A AND Y ARE RESPECTIVELY AIR SIDE AND YANKEE SIDE FRICTION. LOWER S VALUES ARE DESIRABLE.
#/T H8290 PAE = pounds of adhesive per ton of furnish
#/T H565 = pounds of release agent per ton of furnish
#/T A1 = pounds of adhesive per ton of furnish
#/T AZC = pounds of crosslinking agent per ton of furnish
#/T GLYOXAL = pounds of crosslinking agent per ton of furnish
#/T 202-JR = pounds of softener per ton of furnish
* STFI values determined from publication at Tissue Making Conference, October 5–6, 1989 in Karlstad, Sweden, Characterization of Crepe Structure by Image Analysis, Magnus Falk, STFI, Sweden, pp. 39–50.

EXAMPLE 8

This example illustrates that using our novel adhesive formulations, high sheet tension is maintained, while giving the one ply tissue a low sidedness parameter relative to PAE control. The base sheet for one ply was prepared according to the papermaking process of Example 2. The difference between Examples 7 and 8 is that in this example the furnish was refined. The data in Table 8 demonstrate adhesive capacity of the base polymer when coming in contact on the Yankee surface with the dialdehyde or zirconium crosslinking agent in the presence of a softener resulting in lower stiffness values relative to PAE control. Using the refined furnish higher sheet tension values are obtained in the presence of a softener while still having a good sidedness parameter.

TABLE 8

High Basis Weight Basesheet Data (Refining Level = 25 Hp) For One Ply Tissue

| CELL | FORMULATION | SHEET TENSION (G/24 IN) | BW (#/RM) | GMT (G/3 IN) | STFI * LENGTH (μM) | STIFFNESS (G/% STR.-IN) | FRICTION | S(1) |
|---|---|---|---|---|---|---|---|---|
| 3 (control) | 0.2 #/T H8290 PAE<br>1.0 #/T 202-JR<br>0.25 #/T H565 | 786 ± 64 | 17.1 | 1054 | 150 | 37.6 | 0.21 | 0.34 |
| 10 | 0.2 #/T A1<br>1.0 #/T 202-JR<br>0.25 #/T H565 | 866 ± 48 | 17.1 | 1041 | 158 | 31.9 | 0.24 | 0.32 |
| 6 | 0.2 #/T A1<br>0.02 #/T AZC<br>1.0 #/T 202-JR<br>0.25 #/T H565 | 880 ± 29 | 16.6 | 1046 | 174 | 30.6 | 0.23 | 0.34 |
| 7 | 0.2 #/T A1<br>0.10 #/T AZC<br>1.0 #/T 202-JR<br>0.25 #/T H565 | 999 ± 50 | 16.6 | 1016 | 152 | 31.1 | 0.21 | 0.25 |

TABLE 8-continued

High Basis Weight Basesheet Data (Refining Level = 25 Hp) For One Ply Tissue

| CELL | FORMULATION | SHEET TENSION (G/24 IN) | BW (#/RM) | GMT (G/3 IN) | STFI * LENGTH (μM) | STIFFNESS (G/% STR.-IN) | FRICTION | $S^{(1)}$ |
|---|---|---|---|---|---|---|---|---|
| 2 | 0.2 #/T A1<br>0.2 #/T GLYOXAL<br>1.0 #/T 202-JR<br>0.25 #/T H565 | 755 ± 80 | 17.7 | 1193 | 170 | 32.9 | 0.23 | 0.32 |
| 13 | 0.2 #/T A1<br>0.4 #/T GLYOXAL<br>1.0 #/T 202-JR<br>0.25 #/T H565 | 841 ± 38 | 17.2 | 1075 | 163 | 34.1 | 0.24 | 0.35 |

$S^{(1)}$= SIDEDNESS PARAMETER = (A/Y)GMMMD WHERE A AND Y ARE RESPECTIVELY AIR SIDE AND YANKEE SIDE FRICTION. LOWER S VALUES ARE DESIRABLE.
#/T H8290 PAE = pounds of adhesive per ton of furnish
#/T H565 = pounds of release agent per ton of furnish
#/T A1 = pounds of adhesive per ton of furnish
#/T AZC = pounds of crosslinking agent per ton of furnish
#/T GLYOXAL = pounds of crosslinking agent per ton of furnish
#/T 202-JR = pounds of softener per ton of furnish
* STFI values determined from publication at Tissue Making Conference, October 5–6, 1989 in Karlstad, Sweden, Characterization of Crepe Structure by Image Analysis, Magnus Falk, STFI, Sweden, pp. 39–50.

We claim:

1. An adhesive composition comprising an organic polymer having in the polymer backbone amine groups selected from the group consisting of primary and secondary amine groups and mixtures thereof and a crosslinking agent for crosslinking the polymer to a fibrous web, said agent being selected from zirconium compounds wherein the zirconium has a valence of plus four, wherein the composition is a releasable adhesive.

2. An adhesive composition as claimed in claim 1 characterized in that the organic polymer is selected from the group consisting of chitosan, polyvinylamine, polyvinyl alcohol-vinyl amine and polyaminoamide.

3. An adhesive composition as claimed in claim 1 or claim 2 characterized in that the crosslinking agent is a zirconium compound selected from the group consisting of ammonium zirconium carbonate, zirconium acetylacetonate, zirconium acetate, zirconium carbonate, zirconium sulfate, zirconium phosphate, potassium zirconium carbonate, zirconium sodium phosphate and sodium zirconium tartrate.

4. An adhesive composition as claimed in claim 3 characterized in that the organic polymer is selected from the group consisting of polyvinyl alcohol-vinyl amine copolymers of the following structure:

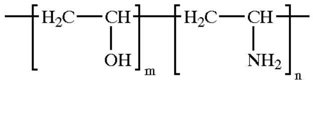

wherein m and n have values of 1 to 99 and 99 to 1 respectively.

5. The adhesive composition of claim 4 wherein m and n have values of 1 to 99 and 2 to 20 respectively.

6. The adhesive composition of claim 1 or claim 2 wherein the crosslinking agent is ammonium zirconium carbonate.

7. An adhesive composition as claimed in claim 6 characterized in that the organic polymer is selected from the group consisting of polyvinyl alcohol-vinyl amine copolymers of the following structure:

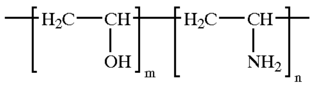

wherein m and n have values of 1 to 99 and 99 to 1 respectively.

8. The adhesive composition of claim 7 wherein m and n have values of 1 to 99 and 2 to 20 respectively.

9. An adhesive composition as claimed in claim 1 wherein the organic polymer is dissolved in water to create a solution, wherein the solution has a liquid component and a solid component and the liquid component is about 90 to about 99% by weight of said solution.

10. An adhesive composition as claimed in claim 1 wherein the weight ratio of the zirconium crosslinking agent to the organic polymer is about 4:1.

11. An adhesive composition as claimed in claim 1 wherein the weight ratio of the zirconium crosslinking agent to the organic polymer is about 0.05:1 to about 2:1.

12. The adhesive composition of claim 1 wherein the adhesive composition, when adhered to a Yankee dryer, exhibits a peel force of about 300 to about 900 grams per 12 inches of fibrous web when using a papermaking machine having a speed of less than 150 feet per minute.

13. The adhesive composition of claim 1 wherein said composition is sprayable.

14. The adhesive composition of claim 1 or claim 2 wherein the crosslinking agent is potassium zirconium carbonate.

* * * * *